C. L. Hawes,
Hotel - Register.

No. 63,889.  Patented Apr. 10, 1867.

UNITED STATES PATENT OFFICE.

CHARLES L. HAWES, OF TITUSVILLE, PENNSYLVANIA.

IMPROVEMENT IN HOTEL-REGISTERS.

Specification forming part of Letters Patent No. 63,889, dated April 16, 1867; antedated January 17, 1867.

*To all whom it may concern:*

Be it known that I, CHARLES L. HAWES, of Titusville, in the county of Crawford and State of Pennsylvania, have invented a new and Improved Advertising Hotel-Register Book; and I do hereby declare the following to be a full, clear, and exact description of the same, sufficient to enable those skilled in the art to which my invention appertains to fully understand and use the same.

This book for the record of the names of the guests in a hotel, and commonly called a hotel-register, has displayed upon the margins of its pages advertisements and business-cards.

The usual provision is made on the blank-ruled portion of the page for the time and date of arrival, the name and residence of each guest.

On the upper, outer, and lower margins of each leaf are displayed advertisements of business-houses, entertainments, railroad or steamboat cards, and other notices whose insertion is worth paying for, and are likely to be interesting to the guest or those who refer to the register. This plan affords a very superior opportunity of placing prominently before the traveling public the advertisements of mercantile houses, manufacturers, professional men, or railroad agents, and has a special facility for reaching them directly.

A convenient and suitable mode of arrangement will be to place the name of the house in a prominent position, certain public notices and cautions in connection therewith, and the other advertisements in the other portions of the upper, lower, and outer margins, each leaf in the book being similar, the contract with the advertising houses extending over a given number of folios, volumes, or time.

Having described my invention, what I claim therein as new, and desire to secure by Letters Patent, is—

A hotel-register book with the margin of its leaves occupied by advertisements, substantially as described.

CHARLES L. HAWES.

Witnesses:
CLARK EWING,
EDWARD H. KNIGHT.